(12) United States Patent
Harris

(10) Patent No.: US 6,980,811 B2
(45) Date of Patent: Dec. 27, 2005

(54) COMMUNICATIONS RESOURCE ALLOCATION METHOD AND APPARATUS

(75) Inventor: John M. Harris, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 448 days.

(21) Appl. No.: 10/205,239

(22) Filed: Jul. 25, 2002

(65) Prior Publication Data

US 2004/0203823 A1    Oct. 14, 2004

(51) Int. Cl.[7] .............................................. H04Q 7/20
(52) U.S. Cl. .............................. 455/452.1; 455/452.2; 455/512; 370/331; 370/342
(58) Field of Search ........................... 455/452, 452.2, 455/512, 509, 452.1, 436; 370/331, 342, 370/282

(56) References Cited

U.S. PATENT DOCUMENTS

| | | | |
|---|---|---|---|
| 5,911,122 A | 6/1999 | Corriveau et al. | |
| 5,930,713 A | 7/1999 | Nguyen | |
| 5,987,331 A * | 11/1999 | Grube et al. | 455/509 |
| 6,282,429 B1 * | 8/2001 | Baiyor et al. | 455/512 |
| 6,292,476 B1 | 9/2001 | Zehavi et al. | |
| 6,317,413 B1 | 11/2001 | Honkasalo | |
| 2003/0103470 A1 * | 6/2003 | Yafuso | 370/282 |
| 2003/0112784 A1 * | 6/2003 | Lohtia et al. | 370/342 |
| 2004/0184423 A1 * | 9/2004 | Tiedmann et al. | 370/331 |
| 2004/0203807 A1 * | 10/2004 | Bl et al. | 455/450 |

* cited by examiner

Primary Examiner—Lester G. Kincaid
Assistant Examiner—Phuoc Doan

(57) ABSTRACT

In a wireless communication system (10) having a plurality of wireless communication resources (such as, for example, channel differentiation codes and radio frequency resources), a common air interface type can be assigned to support a new or on-going call as a function, at least in part, of the difference between a desired operational state of the system and a present operational state of the system. In particular, and for example, voice calls can be assigned to an RC4 common air interface and data calls can be assigned to an RC3 common air interface as needed to provide a balanced allocation of these resources to effect maximum call-handling capacity for the system

30 Claims, 2 Drawing Sheets

US 6,980,811 B2

COMMUNICATIONS RESOURCE ALLOCATION METHOD AND APPARATUS

TECHNICAL FIELD

This invention relates generally to resource allocation and more particularly to allocation of common air interface types.

BACKGROUND

A variety of resources are available for allocation in a modern wireless communications system. For example, in the so-called CDMA2000 standard, the RC3 common air interface has been defined to specifically facilitate voice communications and the RC4 common air interface has been defined to specifically facilitate data communications. These two resources are usually allocated, as indicated, based upon the type of communication being serviced (i.e., voice or data)

Unfortunately, allocation decisions with respect to these two common air interface types can lead to an inefficient allocation of other attendant resources of the system. For example, a given system of this type will have a finite number of orthogonal variable spreading factor codes (such as, for example, Walsh codes) and a given number of radio frequency (RF) resources (such as base site RF interference resources) to use when supporting communications.

In general, for various reasons, a communication system of this type is Walsh code limited; that is, the total number of available Walsh codes (such as, for example, about 60) can usually only support a lesser number of RC3-type voice communications (as one example, the need to accommodate both so-called soft and softer handoffs will usually increase the number of Walsh codes that are dedicated at any given instant to support a single call). Conversely, an RC4-type data call will usually only consume approximately one half as many Walsh codes per call as an RC3-type voice call.

Therefore, in general, the more a system allocates RC3 common air interface types, the smaller the corresponding pool of available Walsh codes. At the same time as the number of Walsh codes diminishes to support a given number of RC3-type calls, however, there can remain a relatively larger number of radio frequency resources. That is, though a given system cell may be unable to support one additional incremental RC3-type call due to an inadequate available supply of Walsh codes, that cell may nevertheless still have available radio frequency resources that could otherwise be allocated to support communications but for the Walsh code limitations.

A somewhat similar situation exists for RC4-type data communications. In general, RC4-type calls tend to require more radio frequency resources per call than do RC3-type calls. Therefore, a large number of RC4-type calls in a given cell will tend to use up the radio frequency resources while leaving an available pool of Walsh codes.

To date, prior art approaches tend to associate a given service (such as data, telephony, dispatch, and so forth) with a given corresponding common air interface. Other supporting resources, such as Walsh codes and radio frequency resources, are then provided in numbers that meet whatever design criteria might be established by the system designer. This tends, unfortunately, to lead to systems having too few or too many such resources during at least some modes of operation. One prior suggestion posits that so-called quasi-orthogonal variable spreading factor codes can be used when a given cell has run out of orthogonal codes. Unfortunately, introducing less than wholly orthogonal codes will likely lead to sub-optimum performance under many operating conditions.

BRIEF DESCRIPTION OF THE DRAWINGS

The above needs are at least partially met through provision of the communications resource allocation method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a wireless communication system has a first and second plurality of wireless communication resources and at least two supported common air interface types that share use of at least some of the first and second plurality of wireless communication resources. At various times (for example, when initiating a new call or during an existing call), the system determines a desired operational status for the system as well as a present view of the actual operational status. Based on a comparison of the actual and desired states, the system then assigns a given one of the common air interface types.

In general, the common air interface type is assigned to achieve a relative balance between the use and availability of the first and second plurality of wireless communication resources. For example, the first resource may comprise a pool of orthogonal variable spreading factor codes and the second resource may comprise a pool of radio frequency resources. When there are relatively fewer codes available and relatively more radio frequency resources available, the common air interface that tends to use fewer codes in favor of more radio frequency resources can be assigned. Conversely, when there are fewer radio frequency resources available and relatively more codes available, the common air interface that tends to use fewer radio frequency resources in favor of more codes can be assigned.

Such assignments can be divorced, at least to some extent, from the type of call itself, such that, for example, an RC3-type of common air interface could be used to support a data communication and an RC4-type of common air interface could be used to support a voice communication. In one embodiment, however, a predetermined level of service as pertains to a given service and/or the given user can also be taken into account to influence, at least to some extent, the specific common air interface that is so assigned.

Figure 1:
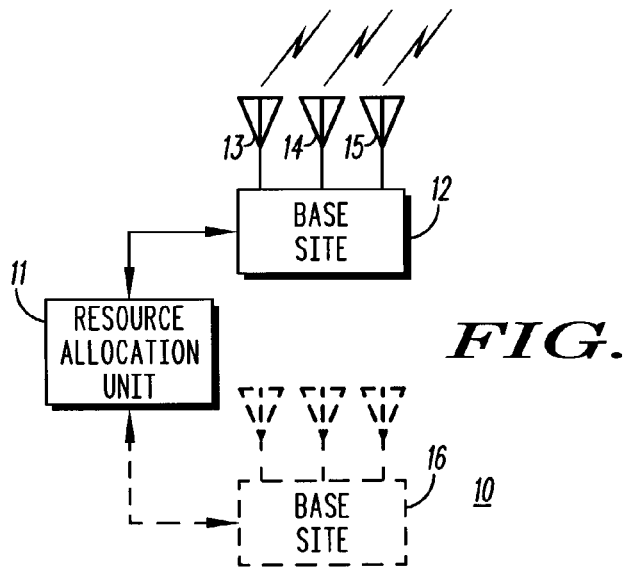
FIG. 1 comprises a block diagram as configured in accordance with an embodiment of the invention.

Referring now to FIG. 1, a not untypical wireless communication system 10 includes at least one base site 12 (though usually one or more additional base sites 16 are used to provide expanded geographic coverage) and a resource allocation unit 11. For purposes of this illustration, the system 10 comprises a CDMA2000 compliant system. The resource allocation unit 11 can be realized through use of a stand alone infrastructure component or can, in an appropriate application, be comprised as a part of one or more of the base sites themselves. The base site 12 will typically support one or more radio frequency transport channels through use of corresponding antennas and transmitters/amplifiers. In this embodiment, the base site 12 supports three such radio frequency resources. This embodiment serves an illustrative purpose only and it should be understood that more, or fewer, radio frequency resources can be used with the concepts taught herein. Such systems 10 are well understood in the art, and additional general description need not be provided here. It should be noted, however, that the resource allocation unit 11 in general comprises a programmable platform that can readily be configured to operate in accordance with the teachings set forth herein.

Figure 2:
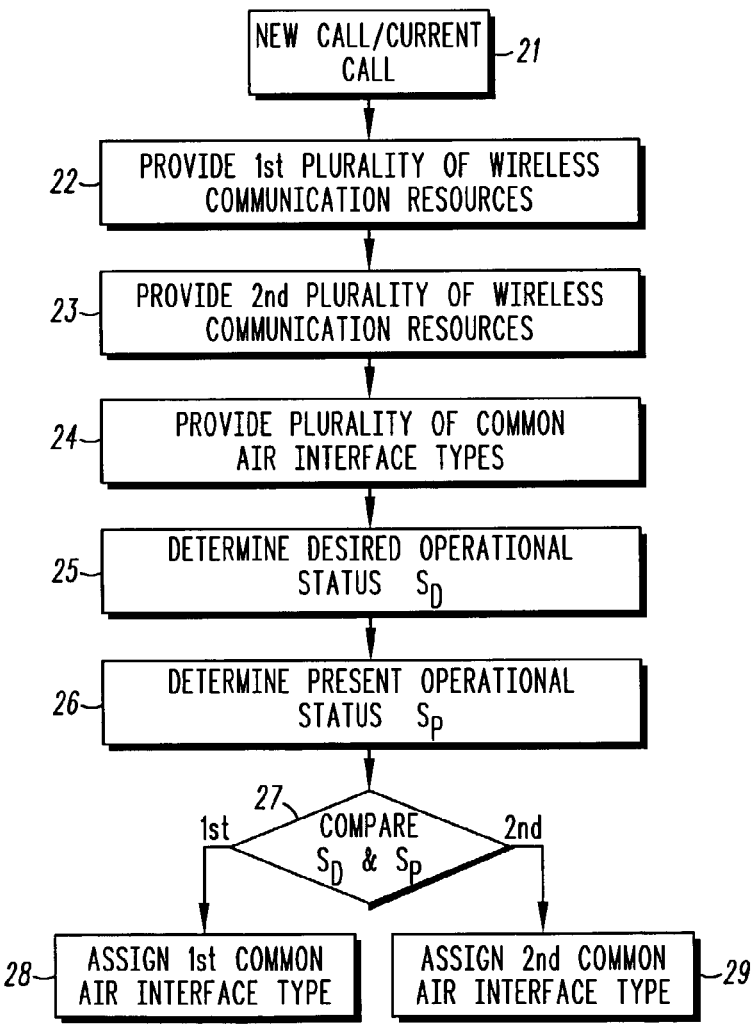
FIG. 2 comprises a flow diagram as configured in accordance with an embodiment of the invention.

Referring now to FIG. 2, common air interface type allocation decisions can be realized at the initiation 21 of a new call and/or during an on-going call as desired and/or as appropriate to the needs of a given application. For example, the common air interface type allocation can be reconsidered for a given in-process call when one or more wireless communication resources (such as channel differentiation codes and/or radio frequency resources) for the system 10 are lower than a given threshold of concern. Such reconsideration can lead to re-typing of an in-process call as otherwise set forth below.

Next, a first plurality of wireless communication resources are provided 22. In this embodiment, for illustration purposes, the first plurality of wireless communication resources comprise a specific number of orthogonal variable spreading factor codes, such as Walsh codes, as well understood in the art. The number of bits used to constitute a given Walsh code can be selectively varied by the system 10, and can range, for example, from 4 bits per code to 128 bits per code. Each resultant Walsh code also typically has a corresponding bit rate, and in general, the bit rate drops as the code length increases. For example, the bit rate for a 64 bit Walsh code is 19.2 kbs whereas the bit rate for a 32 bit Walsh code is 38.4 kbs (these bit rates correspond to RC3-type common air interface compatible coding). In general, total available Walsh code space can be budgeted both over the radio frequency channels and with respect to varying bit lengths as well. (It is worth noting that, pursuant to CDMA2000, a 128 bit Walsh code has a 9.6 kbs bit rate when used in conjunction with the RC4-type common air interface. This bit rate results due to use of coding at a different rate than for the RC3-type common air interface. To compensate for what amounts to a concurrent reduction in the amount of redundancy provided, RC4 is typically viewed as requiring approximately 30% more power than a corresponding RC3 transmission.)

As already noted, the system 10 is also provided 23 with a second plurality of wireless communication resources. For purposes of this illustration this second plurality comprises radio frequency carriers or, in the parlance of CDMA2000, RF interference resources. The amount of RF interference resources per cell may or may not vary from cell to cell, but the overall RF interference resources available will generally be finite. And, again as already noted, a plurality of common air interface types are provided 24. For purposes of this illustration, a first common air interface type comprises RC3 and a second common air interface type comprises RC4, both as envisioned within CDMA2000. It should be understood that additional and/or different common air interface types could be readily accommodated by these embodiments so long as those types tended to use differing proportions of the wireless communication resources that these embodiments seek to manage through prudent allocation.

Figure 3:
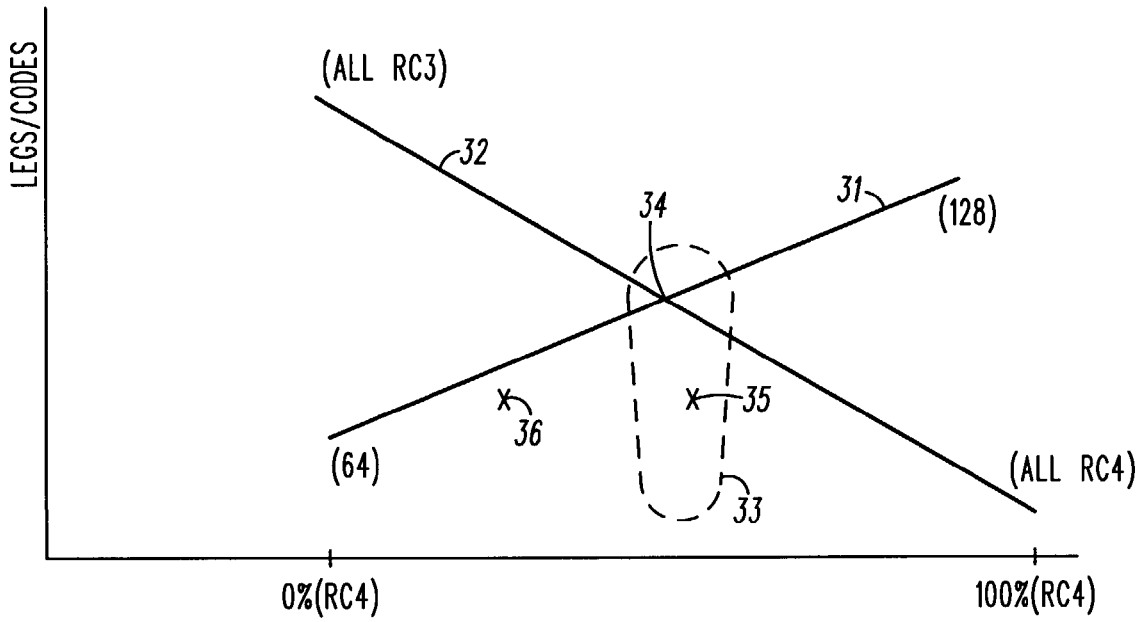
FIG. 3 comprises a graph as configured in accordance with an embodiment of the invention.

The process then determines 25 a desired operational status $S_D$ for the system 10. In particular, the process determines a desired balance regarding usage of the first and second plurality of wireless communication resources. To illustrate this concept, and referring momentarily to FIG. 3, a first line 31 represents over-all Walsh code allocation. This line 31 therefore extends between 0% usage of available codes to effective 100% usage of available codes. This concept of usage includes usage of a code for any purpose (including support of an RC3 or an RC4 call) and at various bit lengths/bit rates. Another line 32 represents the amount of RF interference resources being used to support call traffic. In general, RF interference resource usage is larger when all of the calls are allocated to support RC4 communications and minimized when all of the calls are allocated to support RC3 communications.

The intersection 34 of these lines 31 and 32 represents a relatively ideal maximum allocation of both codes and radio frequency resources—that is, this intersection 34 represents a point beyond which no further calls can be supported and at which a maximum number of calls are being supported given the available resources. A corresponding zone 33 of desired operational status includes this intersection 34 and represents generally a zone of operation within which effective allocations of resources are being realized—that is, this zone 33 identifies a general area of resource allocation where remaining resource availability remains relatively well balanced with respect to different types of resources (such as the number of remaining available Walsh codes as compared to the remaining available radio frequency resources).

Referring again to FIG. 2, the process next determines 26 the present operational status $S_P$ of the system 10. This status need not necessarily represent the immediate and present status of the system 10 but should in general be fairly representative of present operating conditions. For example, and referring again momentarily to FIG. 3, the present operating status regarding the usage of both RF interference resources and codes could be as represented by reference numeral 36 at one point in time, and as represented by reference numeral 35 at another point in time.

Referring again to FIG. 2, the process next compares 27 the desired operational state $S_D$ with the present operational status $S_P$ to access and quantify the difference therebetween. For example, with momentary reference again to FIG. 3, the present operational status $S_P$ as represented by reference numeral 35 is within the optimum operational zone 33 as identified in conjunction with the desired operational status $S_D$. As such, it can be determined that the effective allocation of codes with respect to the allocation of radio frequency resources is relatively balanced. Conversely, the present operational status $S_P$ as represented by reference numeral 36 is outside the optimum operational zone 33 and in particular is relatively close to encountering the Walsh code headroom boundary. This condition, coupled with the significant distance between the present operational status point and the optimum point of maximum-allocation 34, reflects a poor balance of code usage to available radio frequency resources for the present call load. In short, this present operational status point 36 deviates from the desired operational status zone by a considerable amount.

Referring again to FIG. 2, based upon this comparison, the process then assigns 28 and 29 the present call to either the first or the second common air interface type. This assignment can be based upon a variety of conditions, including the following:

- The present balance of code allocation to radio frequency resource allocation is skewed beyond a desired degree in favor of code allocation;
- The present balance of code allocation to radio frequency resource allocation is skewed beyond a desired degree in favor of radio frequency allocation;
- The present call is a voice communication;
- The present call is a data communication;
- The present call is accorded a particular level of service (due to, for example, a pre-existing system definition, a particular subscription agreement, and so forth);
- Presently available resource headroom; and/or
- The time of day and/or day of the week.

Other criteria can be considered as well as desired and/or as appropriate to a given application. In general and in a preferred embodiment, the process will favor allocating RC3 to a voice call and RC4 to a data call. So long as a reasonable quantity of code/RF resources remain available, this allocation preference can continue to be observed. Upon reaching or exceeding a threshold setting for either resource, however, this preference can be made subservient to an allocation scheme that favors balancing usage of the codes and RF resources. In particular, as resources dwindle and as the present operational status deviates unacceptably with respect to the desired operational status, the process can assign new (or existing) voice calls to an RC4 common air interface (when code resources are lagging availability of RF resources) and/or assign new (or existing) data calls to an RC3 common air interface (when RF resources are lagging availability of code resources).

As already noted, this revised preferential allocation mechanism can itself be made subject to exceptions. For example, when code resources are dwindling in an unbalanced fashion, the process may nevertheless assign a given voice call to a code-consuming RC3 common air interface in order to best serve an overriding obligation such as the provision of a particular pre-agreed level of service to the subscriber who is initiating the call. (When making such an unbalanced allocation, it may be appropriate to then re-type an existing RC3 call to the RC4 common air interface to ameliorate to some extent the unbalanced nature of the allocation.)

The desired operating range zone 33 noted above can have boundaries that reflect the needs and/or operating requirements of a given system and application. The range can be thinner or wider than as shown and/or can be offset in different ways with respect to the intersection point 34. Or, if desired, the zone 33 can have other effective threshold boundary shapes. For example, a generally triangle-shaped zone could be used to mirror, to some extent, the downward-extending portions of the two resource lines 31 and 32.

Figure 4:
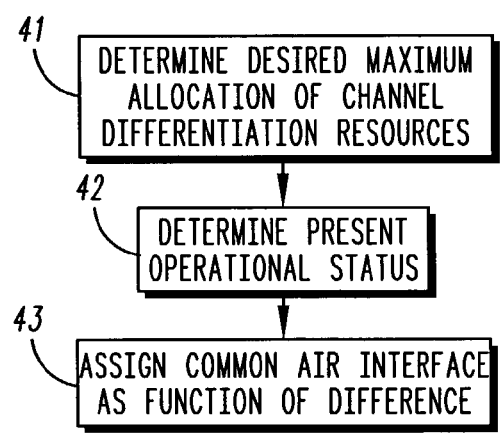
FIG. 4 comprises another flow diagram as configured in accordance with an embodiment of the invention.

FIG. 4 provides a slightly different way of viewing essentially the same process in a specific application. The process begins by determining 41 a desired maximum allocation of channel differentiation resources (these being, for example, the Walsh codes referred to above). The process then determines 42 a present operational status (such as, for example, by identifying the maximum-allocation point of balance described earlier and/or, preferably, a zone of generally balanced resource allocation) and concludes by assigning 43 a common air interface as a function of the difference between the present operational status and the desired maximum allocation of the available resources.

Pursuant to these embodiments, in general, a substantially maximized number of calls can be supported in a wireless communication system by a balanced allocation of resources (including, for example, channel differentiation codes and radio frequency resources) via use of a plurality of common air interface types. These embodiments are suitable for use with a variety of call types and can be used at the initiation of a call or during a call. So configured, an optimum number of calls, given the resources available, are attained during periods of maximum loading. As one particular advantage, these approaches all preserve the use of orthogonal-only variable spreading codes and hence avoid the problems associated with the use of quasi-orthogonal variable spread codes.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. In a wireless communication system, a method comprising:
   providing a first plurality of wireless communication resources and a second plurality of wireless communication resources;
   providing at least first and second air interface types that share use of at least some of the first and second plurality of wireless communication resources;
   determining at least a desired operational status for the wireless communication system;
   determining a present operational status;
   comparing the present operational status with the desired operational status to provide a comparison;
   assigning the first and second air interface types as a function, at least in part, of the comparison.

2. The method of claim 1 wherein providing the first plurality of wireless communication resources includes providing a plurality of orthogonal variable spreading factor codes.

3. The method of claim 2 wherein providing the plurality of orthogonal variable spreading factor codes includes providing a plurality of Walsh codes.

4. The method of claim 1 wherein providing the second plurality of wireless communication resources includes providing a plurality of radio frequency resources.

5. The method of claim 4 wherein providing the plurality of radio frequency resources includes providing a plurality of wireless communication system base site radio frequency interference resources.

6. The method of claim 1 wherein providing the at least first and second air interface types includes providing at least RC3 and RC4 interfaces of a Code Division Multiple Access system.

7. The method of claim 1 wherein determining the at least a desired operational status for the wireless communication system includes determining the at least a desired operational status for the wireless communication system as a function of, at least in part, the first and second plurality of wireless communication resources.

8. The method of claim 1 wherein:
provide the first plurality of wireless communication resources includes providing a plurality of orthogonal variable spreading factor codes;
providing the second plurality of wireless communication resources includes providing a plurality of wireless communication system base site radio frequency interference resources; and
determining the at least a desired operational status for the wireless communication system includes determining the at least a desired operational status for the wireless communication system as a function of, at least in part, the plurality of orthogonal variable spreading factor codes and the plurality of wireless communication system base site radio frequency interference resources.

9. The method of claim 8 wherein determining the at least a desired operational status for the wireless communication system as a function of, at least in part, the plurality of orthogonal variable spreading factor codes and the plurality of wireless communication system base site radio frequency interference resources includes determining a relationship between a capacity of the orthogonal variable spreading factor codes and a capacity of the radio frequency interference resource.

10. The method of claim 9 wherein determining the relationship between the capacity of the orthogonal variable spreading factor codes and the capacity of the radio frequency interference resources includes identifying a predetermined relationship of the capacity of the orthogonal variable spreading factor codes to the capacity of the radio frequency interference resources that substantially corresponds to the desired operational status for the wireless communication system.

11. The method of claim 1 wherein assigning the first and second air interface types as a function, at least in part, of the comparison includes assigning the first air interface type when the comparison facilitates identifying that the present operational status deviates from the desired operational status by more than a predetermined amount.

12. The method of claim 11 wherein assigning the first air interface type when the comparison facilitates identifying that the present operational status deviates from the desired operational status by more than the predetermined amount includes assigning the first air interface type pursuant to a predetermined plan of allocation when the comparison facilitates identifying that the present operational status deviates from the desired operational status by more than a predetermined amount.

13. The method of claim 12 wherein assigning the first air interface type pursuant to the predetermined plan of allocation includes assigning the first air interface type pursuant to the predetermined plan of allocation that includes at least one of:
assigning the first air interface type to support a subsequent wireless communication that would ordinarily be assigned to the second air interface type; and
reassigning the first air interface type to support a current wireless communication that has previously been assigned to the second air interface type.

14. The method of claim 13 wherein assigning the first air interface type to support a subsequent wireless communication that would ordinarily be assigned the second air interface type includes assigning the first air interface type to support a subsequent wireless communication that would ordinarily be assigned to the second air interface type as a function, at least in part, of a predetermined level of service as is associated with the subsequent wireless communication.

15. The method of claim 13 wherein reassigning the first air interface type to support a current wireless communication that has previously be assigned the second air interface type includes reassigning the first air interface type to support a current wireless communication that has previously be assigned the second air interface type as a function, at least in part, of a predetermined level of service as is associated with the current wireless communication.

16. A method for use with a wireless communication system having a plurality of radio frequency resources and a plurality of channel differentiation resources for use in combination with the plurality of radio frequency resources, wherein the wireless communication system can assign either of at least a first air interface type or a second air interface type to support a wireless communication using at least one of the plurality of radio frequency resources and at least one of the plurality of channel differentiation resources, comprising:
determining a desired maximum allocation of the plurality of channel differentiation resources as a function, at least in part, of a corresponding maximum allocation of the plurality of radio frequency resources to provide at least a zone of desired operational status;
determining a substantially current operational status of at least a portion of the wireless communication system;
assigning at least one of a current and a subsequent wireless communication to one of the first and second air interface types as a function, at least in part, of a difference between the substantially current operational status and the desired maximum allocation of the plurality of channel differentiation resources.

17. The method of claim 16 wherein the plurality of channel differentiation resources includes a plurality of orthogonal variable spreading factor codes.

18. The method of claim 17 wherein the plurality of orthogonal variable spreading factor codes includes a plurality of Walsh codes.

19. The method of claim 16 wherein the plurality of radio frequency resources includes a plurality of base site radio frequency interference resources.

20. The method of claim 16 wherein the first and the second air interface types respectively comprises a RC4 and a RC3 interface of a Code Division Multiple Access system.

21. The method of claim 16 wherein determining the desired maximum allocation of the plurality of channel differentiation resources as a function, at least in part, of the corresponding maximum allocation of the plurality of radio frequency resources to provide at least a zone of desired operational status includes determining an intersection between potential maximum allocations of the plurality of channel differentiation resources and potential maximum allocations of the plurality of radio frequency resources.

22. The method of claim 16 wherein assigning the at least one of a current and a subsequent wireless communication to one of the first and second air interfaces type as a function, at least in part, of the difference between the substantially current operational status and the desired maximum allocation of the plurality of channel differentiation resources includes assigning a voice service wireless communication to an RC4 interface of a Code Division Multiple Access system.

23. The method of claim 22 wherein assigning the voice service wireless communication to the RC4 interface of a Code Division Multiple Access system includes assigning a voice service wireless communication having no more than a predetermined grade of service associated therewith to the RC4 interface.

24. The method of claim 16 wherein assigning the at least one of a current and a subsequent wireless communication to one of the first and second air interfaces types as a function, at least in part, of the difference between the substantially current operational status and the desired maximum allocation of the plurality of channel differentiation resources includes assigning a data service wireless communication to an RC3 interface of a Code Division Multiple Access system.

25. An apparatus comprising:
   means for ascertaining a desired operational status of at least a portion of a wireless communication system;
   means for ascertaining a substantially current operational status of at least a portion of the wireless communication system;
   means for assigning one of at least a first and a second air interface types to at least one of a current and a subsequent wireless communication based, at least in part, on a difference between the desired operational status and the substantially operational status.

26. The apparatus of claim 25 wherein the desired operational status represents, at least in part, a maximum allocation of a channel differentiation resource.

27. The apparatus of claim 26 wherein the channel differentiation resource includes a plurality of orthogonal variable spreading factor codes.

28. The apparatus of claim 27 wherein the orthogonal variable spreading factor codes include a plurality of Walsh codes.

29. The apparatus of claim 25 wherein the first and the second air interface type respectively comprises a RC4 and a RC3 interface of a Code Division Multiple Access system.

30. The apparatus of claim 25 wherein the wireless communication comprises either of a voice service communication and a data service communication.

* * * * *